United States Patent [19]
Plake

[11] 3,739,592
[45] June 19, 1973

[54] CONICAL STABBING GUIDE AND CLAMP SYSTEM FOR RISER PIPE INSTALLATION

[75] Inventor: William Edgar Plake, Beaumont, Tex.

[73] Assignee: Brown & Root, Inc., Houston, Tex.

[22] Filed: Sept. 29, 1971

[21] Appl. No.: 184,692

[52] U.S. Cl. .................. 61/72.1, 16/171, 61/72.3, 166/.6
[51] Int. Cl. ........................... F16l 1/00, E05d 1/06
[58] Field of Search ................ 61/72.3, 72.1, 46.5, 61/46; 166/.6, .5; 240/73, 224; 49/190; 16/171

[56] References Cited
UNITED STATES PATENTS

| | | | |
|---|---|---|---|
| 3,373,570 | 3/1968 | Hindman | 61/72.3 |
| 3,503,218 | 3/1970 | Broadway | 61/72.3 |
| 2,324,655 | 7/1943 | Tozer | 248/244 X |

FOREIGN PATENTS OR APPLICATIONS

| | | | |
|---|---|---|---|
| 1,220,689 | 1/1971 | Great Britain | 61/465 |

*Primary Examiner*—Jacob Shapiro
*Attorney*—James E. Cockfield

[57] ABSTRACT

An apparatus and method are herein provided for installing a riser pipe on an offshore platform. A plurality of vertically aligned female cone members may be clamped along the length of the platform. A monorail may be secured to the riser pipe and aligned along the axis thereof. Mating male cone members may be slidably mounted on the monorail of the riser and roughly positioned for insertion into the female cones. A guide line may be fun from a surface winch through a dead man ring or sheave mounted on the platform beneath a female cone member and up through the cone member to connect with the lower end of the mating male cone member. The riser pipe may be supported by a surface crane and disposed with the lower end of each male cone positioned generally above a female cone. The riser pipe is lowered so that the male cones are partially inserted within the female cones. In this step, the guide line may be utilized as a positive control means of bringing the cones into alignment for proper mating engagement. After the cones are properly engaged, locking pins may be inserted through the lower portions of the male cones and a frictional connection between each male cone and the monorail released to slide the riser pipe downwardly to its final position. The riser pipe may be jetted into the water bed in the conventional manner. With the riser pipe buried in the water bed in the final position, a diver may retighten the frictional connection to lock the male cones to the monorail. Additional means may be provided for universally adjusting the connection so as to cure minor misalignments after the riser is in a final position. The relationship of the male and female cone members may be reversed so that the female cone is slidably mounted on the monorail of the riser pipe and the male cone is mounted on the platform. In this last configuration, it may be preferable to mount the mating cone members so they extend in an upwardly direction.

29 Claims, 9 Drawing Figures

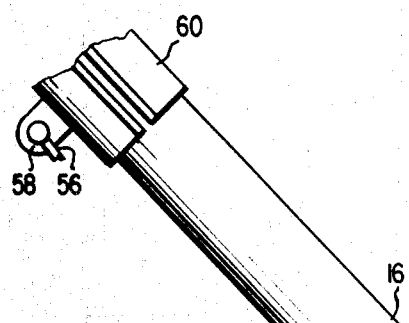
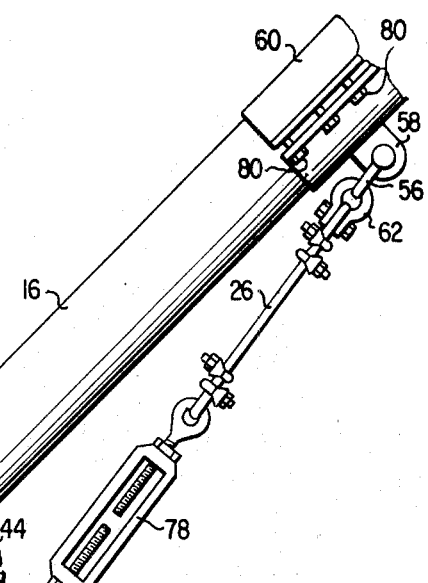
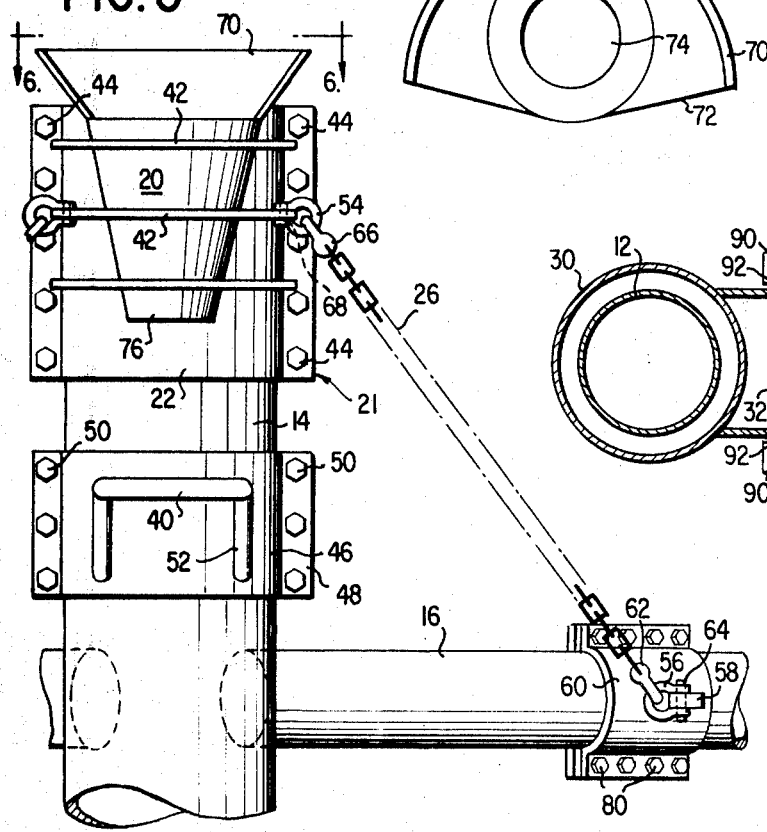
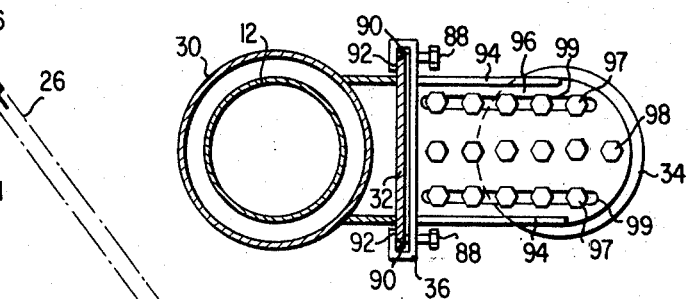

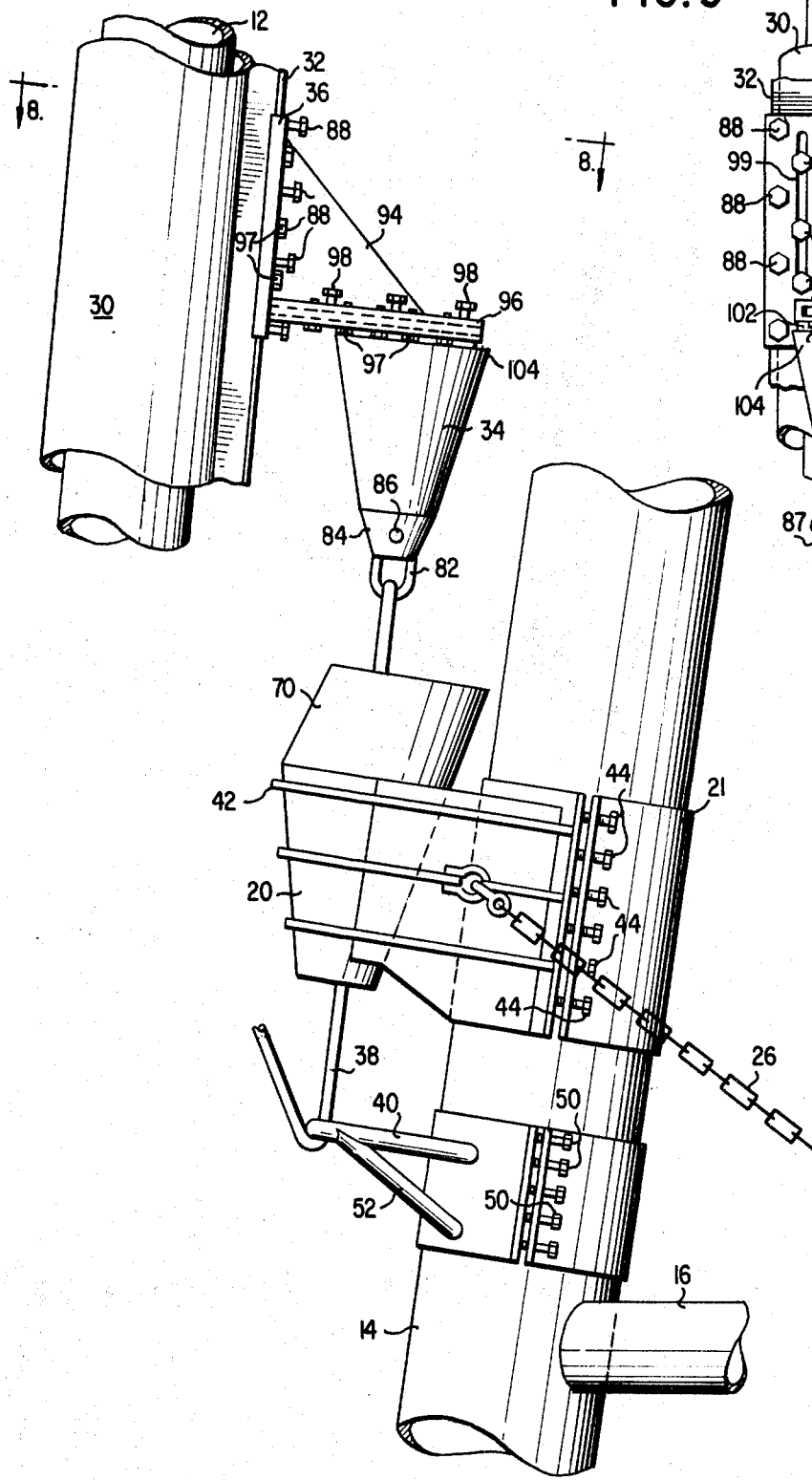
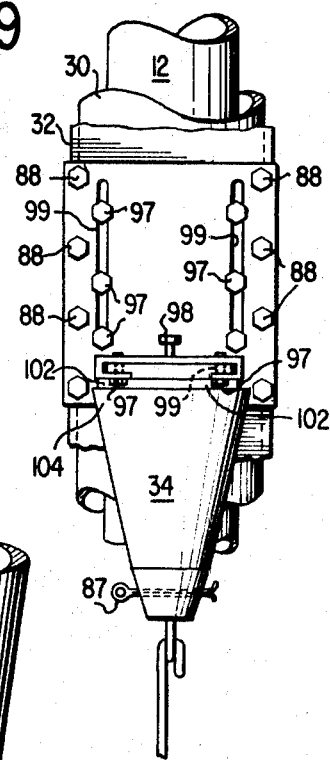

CONICAL STABBING GUIDE AND CLAMP SYSTEM FOR RISER PIPE INSTALLATION

BACKGROUND OF THE INVENTION

The invention relates to an apparatus and method for installing riser pipes to offshore platforms and more specifically relates to an apparatus and method for guiding a riser pipe into a mounting position adjacent an offshore platform and also for clamping the pipe thereto in one operation, using the same apparatus for both functions.

During the past few years, increased oil and gas exploratory activity has occurred at substantial distances from shore lines in bodies of water such as the Gulf of Mexico. Such increased oil and gas exploratory activity and the consequent discovery of producing oil and gas have necessitated many improvements in bringing the produced oil and gas to the shore in an economical, safe, and practical manner. One of the most desirable methods for transporting gas and oil produced from offshore wells is through pipelines systems which connect an offshore wellhead to suitable shore facilities.

A satisfactory arrangement for coupling a pipeline to a producing well has been found to be through a riser pipe or vertical tubular structure coupled, at one end, to a pipeline which is laid on the bed of a body of water and, at the other end, to related apparatus on the platform structure adjacent the wellhead. In past practice, the installation and coupling of riser installations from each well to the pipeline has proven to be a cumbersome, expensive, and sometimes dangerous task. The use of divers has been found necessary to install the risers and, since the depth of the water in which producing wells are being developed has increased over the years, the use of divers has been substantially adversely affected due to various physical limitations imposed by water depths of greater than 175 or 200 feet. In water depths in the vicintiy of 200 feet and deeper, a diver is incapable, without expensive procedures being employed, of staying down except for very short periods to time and, therefore, the number of divers required per job has considerably raised the cost of riser installation operations.

It would therefore be a significant advancement in the art if means and method could be provided for shortening the period of time required for safe installation of a riser pipe on an offshore platform. Similarly, if the number of diver man hours required for installing such a riser pipe could be reduced, a substantial reduction in cost and human exposure to danger could be provided.

OBJECTS AND SUMMARY OF THE PRESENT INVENTION

It is therefore an object of the present invention to rovide a new and improved means and method for installing riser pipes on offshore platforms wherein many of the problems encountered in using existing equipment are obviated.

It is another object of the present invention to provide a new and improved means and method for installing a vertical tubular structure adajcent a platform disposed in a body of water.

It is another object of the present invention to provide a means and method for installing a riser pipe on an offshore platform in an economical, safe, and effective manner.

It is still another object of the present invention to provide a means and method for installing a riser pipe on an offshore platform utilizing fewer diver man hours than has heretofore been practical.

It is yet another object of the present invention to provide a means and method for installing a riser pipe on an offshore platform wherein the need for supporting a riser pipe in a nearly final position while a diver sets riser mounting clamps is eliminated.

It is a further object of the present invention to provide a means and method for installing a riser pipe on an offshore platform wherein each step during the installation operation may be positively controlled from the surface of the body of water.

It is yet a further object of the present invention to provide a means and method for installing a riser pipe on an offshore platform wherein the riser may be removed by simply removing a plurality of locking pins from the clamping means and lifting the riser with surface crane equipment.

It is still a further object of the present invention to provide a means and method for installing riser pipes on offshore platforms wherein the currently existing problem of fitting up and adjusting riser pipe clamps is minimized.

The objects of the present invention are carried out by the provision of a means and method for securing a vertical tubular structure to a platform situated in a body of water wherein mating cone members are adjustably connected to the tubular structure and to the platform. A guide line may be used to direct a male member of each mating pair of cones into the female member and a locking pin may be inserted through a portion of the mating cones to secure the cones in an engaged position. A monorail structure may be mounted on the tubular structure to slidingly guide the tubular structure into a final resting position where it may be connected with an underwater pipeline. Adjustment means are associated with the mating cone pairs which may be universally adjusted while the tubular structure is mounted on the platform.

BRIEF DESCRIPTION OF THE DRAWINGS

While the invention is particularly pointed out and distinctly claimed in the concluding portion of the specification, a preferred embodiment is disclosed in the following detailed description which may best be understood when read in connection with the accompanying drawings in which:

FIG. 5 is an elevation view of a female cone member and a ring clamped to an upright member of an offshore platform;

FIG. 6 is a partial sectional view of the upright platform member and the female cone member shown in FIG. 5 taken along line 6—6;

FIG. 7 is a partial elevation view of the feamle member and upright platform member shown in FIG. 6 in operational relationship with a riser pipe and a male cone member;

FIG. 8 is a sectional view of the riser pipe and the male cone member of the conical pair shown in FIG. 7 taken along line 8—8; and FIG. 9 is an elevation view of the riser pipe and the male cone member shown in FIG. 7.

DETAILED DESCRIPTION OF THE PREFERRED EMBODIMENT

Figure 1:
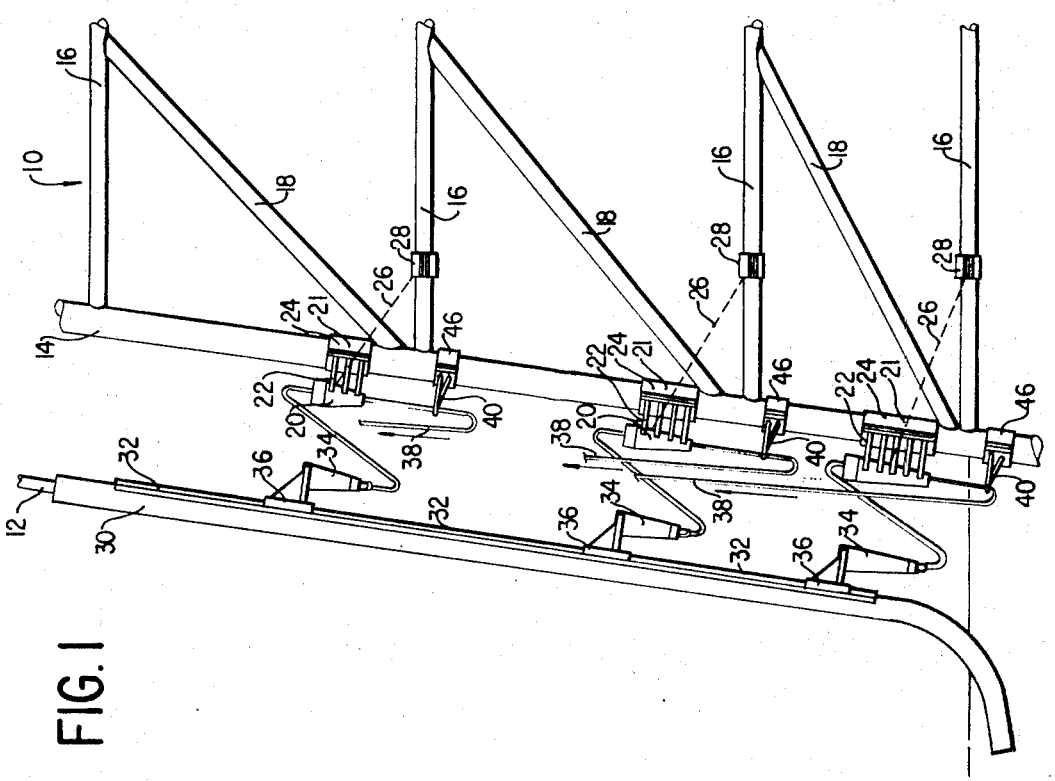
FIG. 1 is an elevation perspective view of the overall apparatus of the present invention.

Referring now to the drawings in which like numerals are used to indicate like parts throughout the various views thereof, FIG. 1 shows a portion of an offshore platform indicated generally as 10 and a riser pipe 12 being brought into position adjacent an upright member 14 of the offshore platform 10.

The offshore platform 10 includes a plurality of horizontally extending support members 16 and associated diagonally extending members 18. A plurality of female cones 20 are vertically aligned with and mounted on the upright member 14 of the offshore platform 10. The cones are mounted by means of conventional clamps comprising a split collar 21 having a cone supporting half 22 and a clamping half 24. The two halves 22 and 24 may be secured by any conventional means such as a bolt and nut combination extending through aligned holes defined in flanges which are formed in the halves 22 and 24 which will be described in detail in connection with FIGS. 5-9. Cable stays 26 may be attached at one end thereof to each cone 20 and at the other end thereof to a second clamp 28 mounted on a horizontally extending strut member 16. The stays 26 provide stability and reinforcement to the connection between the cone 20 and a supporting member of the platform.

The riser pipe 12 is encased in and grouted to an outer casing 30 which extends axially along the riser pipe at least along the section of the pipe which will be directly connected with the offshore platform 10. A monorail 32 is welded to the surface of the outer casing 30 of the riser pipe 12 and extends axially with respect thereto. Male cone members 34 are slidably mounted on the monorail by means of a bracket-like base member 36 which is configured to conform to the monorail. The detailed construction of the base member 36 supporting the male cone 34 will be described in connection with FIGS. 6-9.

A guide line 38 is secured to the lowermost portion of each male cone and is run down through an associated female cone and out through an open lower end thereof. The guide line is then run downwardly through a cable pulling ring 40 and upwardly to a surface winch (not shown). The cable pulling ring 40 is mounted on the upright member 14 of the offshore platform 10 in a position vertically spaced beneath each female cone and operates as a dead man for positively controlling, from the surface, the movement of the male cone 34.

Figure 2:
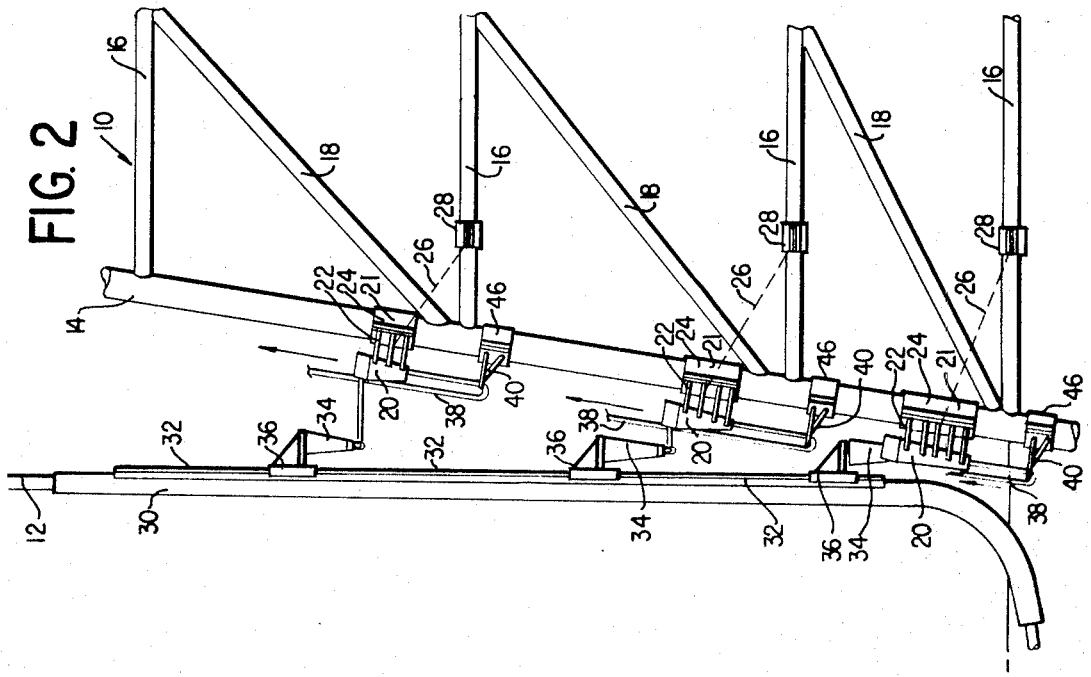
FIG. 2 is an elevation perspective view of the apparatus shown in FIG. 1 with a lowermost guiding and clamping pair of cone members in partial engagement relationship.

Referring now to FIG. 2, it can be seen that the lowermost of the male cones 34 has been partially inserted within the lowermost of the female cones 20. The riser is supported by means of a surface crane during the insertion operation and the action of the guide line 38 is operable to bring the male cone 34 into engagement within female cone 20 with a minimum of assistance from a diver stationed adjacent the mounting apparatus. It will be noted, that the length of the male and female cones, 34 and 20, increases from top to bottom so as to provide a more substantial support at the lowermost connection and to facilitate installation by providing a more pronounced clearance for the swinging of the male cones 34 into approximate alignment with the female cones 20 for the final insertion and latching engagement thereof.

The operation shown in FIG. 2 may be conducted with the clamping devices all comprising vertically mating cones or may be accomplished using a vertically mating conical pair only as a bottom clamp and guide and utilizing conventional standard clamps along the remaining upward portion of the installation.

Figure 4:
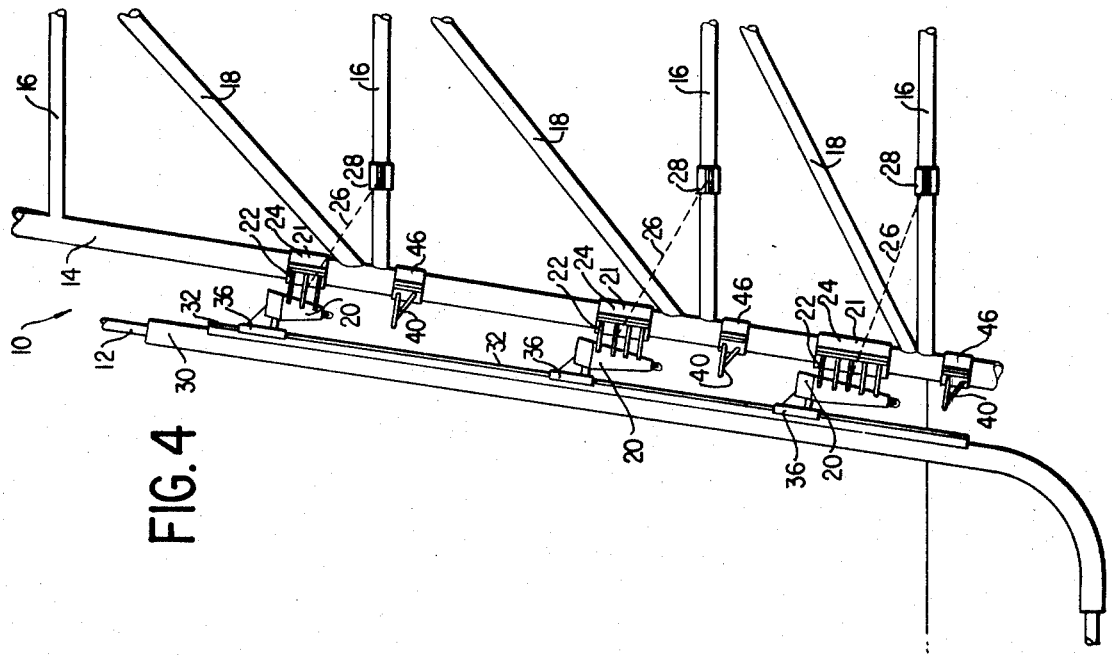
FIG. 4 is a final sequence view of the apparatus shown in FIGS. 1, 2 and 3 with all the included conical members in a final locked position and the riser pipe in a final position in the bed of a body of water surrounding an offshore platform.
Figure 3:
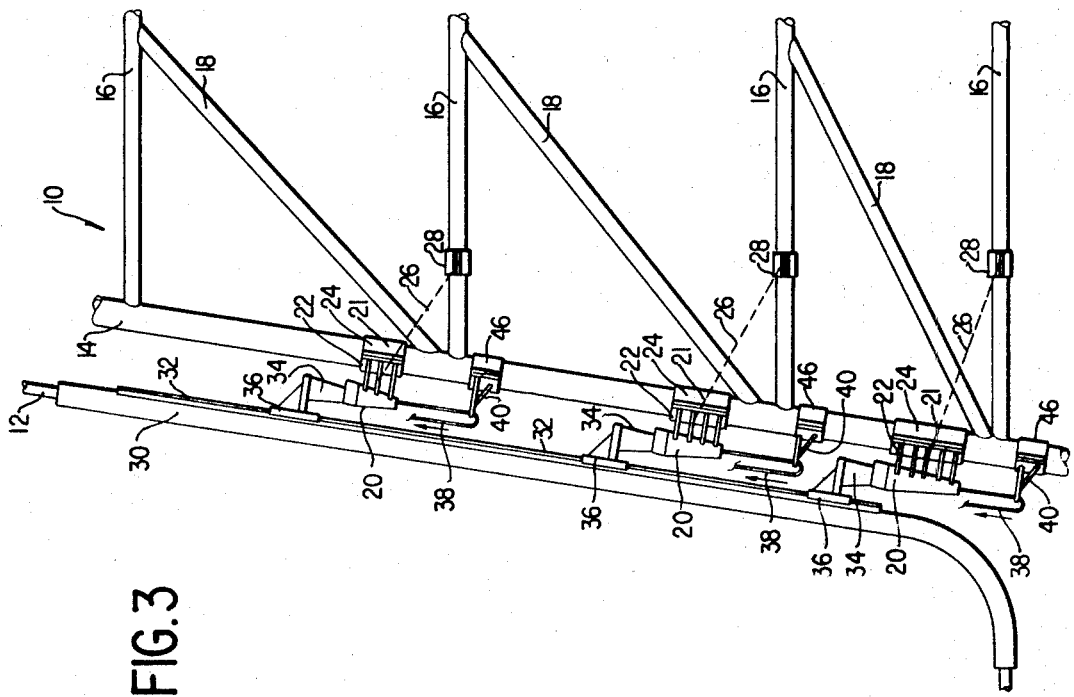
FIG. 3 is a sequence perspective view of the apparatus shown in FIGS. 1 and 2 showing all the included cone members in partial mating engagement.

FIG. 4 shows the apparatus of FIG. 3 wherein the vertically mating cones 34 and 20 have been fully inserted and the riser pipe has been lowered to its final position. Positive positioning of the riser pipe is accomplished after the cones have been lockingly engaged by loosening frictional gripping means such as set screws or set bolts which may be used to lock the base member 36 of the male cone 34 with the monorail 32. Upon loosening the set bolts (see FIGS. 7 and 8), the riser is permitted to slide downwardly as the monorail 32 rides through the bracket-like base member 36 of each male cone. When the riser is in the final position shown in FIG. 4, the set bolts (not shown in FIG. 4) may be retightened and any final minor adjustments may be made to relieve undesirable stresses. These adjustments may be made by loosening the clamp members 24 and 22 of the female cone and by rotating the female cone about the upright member 14 or by moving the female and male cones vertically along the upright member 14 or the track monorail 32 or by adjusting the standoff distance of the riser from the upright member 14 by means of slidable members incorporated within the mounting structure of the vertical cone which slidable members will be discussed in detail with respect to FIGS. 6-9. Of course, through bolts 97 could be inserted through slots 99 formed in either or both the base member of the male cone and the monorail as an alternative to the frictional locking set-bolts. Similarly, through bolts 97 and set bolts could be used in combination wherein the set bolt would first be tightened and then the through bolts installed.

Referring now to FIG. 5, an elevation view of the female portion of the mating cone arrangement is shown properly mounted on an upright member 14 of an overall platform 10. It can be seen, the the female cone 20 is supportdd by means of horizontally extending web members 42. The web members 43 are, in turn, formed as a part of or welded to portion 22 of the overall clamping collar 21 used to secure the female cone 20 to the upright member 14. A plurality of nut and bolt combinations 44 are provided and are operable to secure the two portions 22 and 24 of the female cone clamp together and in mounting engagement with the upright member 14. It is the nut and bolt combinations 44 which are loosened to vertically position or to rotatably arrange the female cone 20 with respect to the remaining portions of the overall apparatus.

The cable pulling ring 40 is shown vertically spaced beneath the female cone 20 and mounted on the upright member 14 in a manner substantially similar to the mounting of the female cone 20. A collar-like clamping member 46 is provided for mounting the ring member 40 on upright member 14 and is formed with flanges 48 which define holes for the insertion of bolt and nut combinations 50. The collar-like clamp member 46 for the cable pulling ring 40 may be adjusted vertically and rotatably about the upright member 14 in a manner similar to the adjustment of the female cone 20. The cable pulling ring is provided with support struts 52 which have some vertical component for providing strength in the vertical upward direction which is normal to the plane coincident with the ring 40. The strut members 52 are effective for supporting the upwardly directed forces acting on the ring by the action of the guide line 38 when the male cone 34 is being pulled into mating engagement with the female cone 20. Of course, a sheave or pulley-like member could be substituted for the ring 40. Eye members 54 may be pivotably connected to one of the web members 42 supporting the female cone 20. The eye members 54 are used for connecting one end of a stay wire 26 with a similar eye member 56 which is pivotally mounted in pad eye member 58 which is rigidly formed as a part of a collar-like clamp member 60. The eye member 56 is pivotable within the rigid eye member 58 so that an eye member 62 connected at one end of the stay wire 26 and inserted through the pivotable eye member 56 of the clamp 60 is provided with universal movement. A pivot pin 64 may be inserted through the rigid eye member 58 and extended through the C-shaped ends of the pivotable eye member 56. The other end of the wire stay 26 terminates with an eye member 66 which engages within the eye member 54 attached to the web portion 42 of the female cone supporting clamps 21. The eye member 54 mounted on the female cone clamp 21 may also be provided with a pivotable feature by mounting it with a pivot pin 68 extending through the C-shaped ends of eye member 54 and through the mounting web portion 42 of the female cone supporting half 22 of the collar-like clamping mechanism 21.

Referring to FIG. 6, a partial sectional view of the apparatus of FIG. 5 is shown wherein it becomes apparent that a funnel-shaped lip 70 is formed about the upper periphery of the female cone 20. The outward edge 72 of the funnel 70 formed on the upper peripheral edge of the female cone 20 is left open so as to facilitate the insertion of a male cone 34 at which point of insertion the funnel 70 catches thd cone 34 and guides it into a central hole 74 defined by the interior of the female cone 20. The lowermost portion 76 of the female cone 20 is open so that a male cone inserted therein will extend through the lowermost portion 76 thereof.

As shown in FIG. 6, the stay wires 26 may be adjusted in length by means of turnbuckles 78. Also, the clamping members 60 secured to one terminal end of the stay wire 26 may be moved horizontally along the member 16 by loosening nut-bolt combinations 80 and sliding the clamp 60 into a desired final position. The clamp 60 may be moved for rough adjustments and the turnbuckles may be used to tension the stay wire and make fine adjustments.

FIG. 7 shows the female cone 20 of FIGS. 5 and 6 with a male cone 34 and an attached riser pipe 12. It will be noted, that the guide line 38 is secured to one terminal end thereof to an eye member 82 attached to the lowermost end 84 of the male cone member 34.

The guide line 38 runs through the central opening 74 defined by the female cone and down through the cable pulling ring 40. The guide line then runs upwardly to a surface winch (not shown).

The male cone member 34 is formed with a laterally extending bore hole 86 formed through the lowermost end 84 thereof. When the male cone 34 is fully inserted within the female cone 20 a locking pin such as a cotter pin or the like is inserted into the bore hole 86 to prevent the cone from being removed from within the female cone 20 due to wave action or violent pressure variations in the riser pipe.

The base member 36 which supports the male cone 34 on the mono-rail 32 is shown in FIGS. 7, 8 and 9 to comprise a bracketed C-shaped member having two rows of longitudinally spaced threaded holes for insertion of and threaded engagement with a plurality of set screw-like members 88. The monorail is shown to comprise a T-shape in cross sectional configuration. The terminal ends 90 of the C-shaped base member 36 engage under the laterally extending portions 92 of the T-shaped monorail so as to slidingly secure the base member 36 to the monorail 32.

Two vertically extending gusset plates 94 connect the C-shaped base member 36 with a second C-shaped member 96. The C-shaped member 96 is arranged with the planar extension thereof perpendicular to the planar extension of the base member 36. The second C-shaped member 96 is formed with a plurality of threaded holes longitudinally spaced along the center thereof for the threaded engagement of set screw-like members 98. The terminal ends 100 of the second C-shaped member 96 engage on the under side 99 of a T-shaped cross sectional extension 102 formed on the upper portion 104 of the male cone 34. The cross sectional T-shaped extension 102 is formed as a part of or is rigidly attached to the upper portion 104 of the male cone 34 which extension 102 rides within the space defined by the C-shaped cross sectional area of the member 96 and may be fixed with respect thereto by tightening several of the set bolt-like members 98 into pressure engagement with the T-shaped extension 102 through the C-shaped member 96. Once again through bolt and slot arrangements could be substituted for the set bolt members 93 or used in combination therewith.

It will be apparent from a perusal of the slidable nature of the base member 36 and the T-shaped extension 102 of the male cone 34 that the male cone 34 may be moved vertically along the monorail or horizontally along the second C-shaped member 96 until an exact desired final position for the male member 34 has been reached. At that point, the set screw-like members 88 and 98 associated with the C-shaped members 36 and 96 may be tightened so as to rigidly fix the male cone 34 in the desired position.

BRIEF SUMMARY OF RISER PIPE INSTALLATION PROCEDURE

As has been already noted, it is only necessary to have one vertically mating cone pair to practice the present invention. When using only one such cone combination, it is preferred, although not necessary, that the cone pair be positioned as the lowermost clamping member of a series of vertically aligned clamping members for mounting the riser pipe adjacent the upright member of an offshore platform.

When installing a riser pipe in accordance with the present invention, the female cones are installed on the upright member 14 of the offshore platform and are roughly positioned for the insertion of male cones attached to the riser pipe. The cable stays 26 are secured to the female cones at one terminal end and to either the horizontal support member 16 or the diagonal support member 18 at the other terminal end thereof. A cable pulling ring 40 is installed vertically beneath each female cone 20. The riser pipe is supported in the position adjacent the upright member of the platform by means of a surface crane. The cone guide line 38 is thrdaded from the surface winch through the cable pulling ring 40, up through the female cone 20 and then secured to the pad eye 82 on the lower portin 84 of the male cone 34. While holding the riser pipe so that the male cone 34 attached thereto will clear the tops of the associated female cones 20, the male cone is pulled into the female cone guide by means of the guide line. The funnel portion 70 formed about the upper periphery of the female cone 20 assits in catching the lower end 84 of the male cone 34. The riser pipe is then lowered until the male cone 34 and the female cone 20 are partially engaged. This cone engagement step is repeated for each male and female cone combination used for the connection.

After the vertically mating cones have been axially aligned, all the cones are seated by relaxing the surfaced support and permitting the male cones to forcibly engage within the female cones. Locking pins are then inserted in the latch holes 86 formed in the lower portion 84 of each male cone and the guide line 38 is removed. The set screws 88 between the base portion 36 of the male cone and the monorail 32 are loosened and the riser pipe is permitted to slide downwardly into a final position. Conventional pipe laying equipment may be used to jet away a trough in the mud bed to position the bottom portion of the riser therein. The riser pipe positioning operation is performed by the sliding of the monorail 32 through the C-shaped cross sectional configuration of the base portion 36 of the male cone. After the riser pipe has settled into a final position, all the set screws 88 on the base portion 36 are tightened so as to rigidly secure the riser pipe to the male cone 34 which, in turn, is fully supported within the female cone 20 and latched thereto by means of the locking pin 37.

After the riser pipe has been tightened in its final position, a diver may loosen the various set screws of the apparatus and universally adjust the female cone member so as to relieve any unexpected stresses or dimensional misalignments.

SUMMARY OF THE ADVANTAGES OF THE INVENTION

It can be seen that an apparatus and method have been herein provided for installing riser pipes on offshore platforms. The present invention obviates the need for supporting the riser pipe in exact alignment, from the surface, while a diver tightens the clamps used to make the connection. The guide line 38 and female cone funnel portion 70 make it possible to positively control the movement of the riser pipe into a properly aligned position and to stab each connection into a final connection merely with the used of surface power and with a minimum of diver effort. The monorail and the horizontal and vertical adjustment features of the invention enable a diver to make dimensional adjustments without removing the riser from the connection. The mono-rail, which is ordinarily available only on platforms originally provided with permanent monorail systems, provides positive control for lowering the riser pipe. A fixed position with respect to the platform is then effected by the simple tightening of a pluralty of set screws and installing of a latch pin. Riser pipe removal is similarly facilitated by simply removing the latching pins and lifting the riser by means of the surface crane.

Using the present invention, fewer divers are necessary to make the various connections and adjustments associated with the installation of riser pipes. Also less time is required for positioning and mounting a riser pipe at an offshore platform site. The cumulative effect of all the aforementioned advantages is that riser pipe installation operations are now safer, less expensive and less cumbersome than heretofore possible.

While what has been shown herein is a preferred embodiment of the present invention, it is of course understood that various modifications and changes may be made herein without departing from the invention. For example, the position of the male and female cone members may be reversed so that the female cone is mounted on the riser and the male cone is mounted on the platform. Also, if a monorail is already mounted on a platform, adjustable female cone members could be fitted with C-shaped bases and slidingly positioned on the monorail for engagement with male cones on the riser pipe. It is therefore intended to cover in the appended claims all such modifications and changes as may fall within the true spirit and scope of the present invention.

I claim:

1. In an apparatus for attaching a riser pipe to an offshore platform wherein the platform includes structural member means and a clamp means for securing the riser pipe to the structural member means the improvement comprising:
   the clamp means including at least,
      a first pair of vertically alignable mating cone members, and
      a second pair of vertically alignable mating cone members, said first and second pair of mating cone members having variatn axial lengths,
   rail mdans fixedly mounted on either said riser pipe or said offshore platform and slidably secured to one member of each of said at least first and second pair of mating cone members;
   whereby the riser pipe may be positioned next to the offshore platform by pivoting said riser pipe about the longer of said first and second pair of mating cone members after partial mating engagement thereof.

2. An apparatus according to claim 1 with the addition of:
   at least one guide line means attached at a first end thereof to one of said mating cone members of at least one of said first and second mating cone members and passing through the other of said mating cone members to a point adjacent
   the surface of said body of water at a second end thereof;
   whereby said second end of said guide line means may be manipulated to positively control the engagement of said vertically alignable mating cones.

3. In an apparatus for attaching a riser pipe to an offshore platform wherein the platform includes structural member means and a clamp means for securing the riser pipe to the structural member means the improvement comprising:
   the clamp means including at least one pair of vertically alignable cone members;
   rail means fixedly mounted on the riser pipe and slidably secured to one member of dach of said at least one pair of mating cone members;
   a ring means secured to the structural member beneath said vertically alignable mating cone members; and
   guideline means attached at a first end thereof to one of said mating cone members passing through the other of said mating cone members, passing through said ring means, and to a point adjacent the said surface of said
   body of water at a second end thereof;
   whereby the one of said mating cone members may be guided into an engagement with the other of said mating cone members in response to an upward pull on said guideline toward a second end thereof and whereby the riser pipe may be downwardly guided to a position within the bed of a body of water surrounding the offshore platform.

4. An apparatus according to claim 3 with the addition of locking means for securing said at least one pair of vertically alignable mating cone members in engagement with each other.

5. An apparatus according to claim 4 wherein said locking means comprises a locking pin inserted through a bore hole formed transversely through at leat one of said mating cone members.

6. Apparatus for attaching a riser to an offshore platform comprising:
   a casing coaxially surrounding said riser pipe, secured to said riser pipe and extending longitudinally along at least a portion thereof,
   rail means secured to said casing and extending longitudinally thereof;
   clamp means including vertically alignable mating cone members one of said cone members being slidably mounted on said rail means and the other of said cone members being connected to said offshore platform;
   locking means included on said clamp means and operable to fixedly secure said clamp means to said rail means; and
   whereby said riser pipe may be slidably guided in the vertically downward direction by supporting said clamp means in a fixed position and releasing said locking means.

7. Apparatus comprising:
   male cone means;
   a generally C-shaped bracket base for supporting said cone means and extending generally longitudinally with respect to the longitudinal extension of said male cone means;
   a second C-shaped bracket member rigidly secured to said C-shaped bracket base member;
   said second generally C-shaped bracket member being generally perpendicular to the planar extension of said generally C-shaped bracket base member;
   a base portion of said male cone member being formed wtih a generally T-shaped cross-sectional area;
   said generally T-shaped cross-sectional base portion of said male cone member being slidably engageable within said generally C-shaped cross-sectional configuration of said second C-shaped bracket member;
   locking means provided on said second generally C-shaped bracket member for fixedly securing said male cone to said second generally C-shaped member;
   whereby the position of thd axis of said male cone member may be adjusted with respect to the planar extension of said generally C-shaped bracket base member.

8. An apparatus according to claim 7 with the addition of pad eye means disposed at a free end of said male cone member.

9. An apparatus according to claim 8 wherein:
   said locking means includes set bolts threadedly engaged through said second generally C-shaped bracket member and engageable with a surface of said generally T-shaped cross-sectional base portion of said male cone;
   wherein said locking means further includes through bolts inserted through slots formed in said C-shaped bracket member and said T-shaped base portion; and
   whereby said set bolts may be tightened to hold associated cone apparatus in a fixed position for the insertion and tightening of said through bolts in said slots.

10. Apparatus comprising:
    female cone means;
    said female cone means being generally hollow and open at the axial ends thereof;
    funnel means disposed about a first axial end of said female cone means;
    a portion of said funnel means being cut away to form an axial slot for the radial insertion of a male cone member into the area defined by said funnel means;
    clamp means for securing said cone means to a structural member of an offshore platform;
    said clamp means being slidable longitudinally of said structural member means;
    tightening means for fixedly securing said clamp means at a desired position along the longitudinal extension of said structural member means;
    whereby said female cone means may be positioned at any desired point along the longitudinal extension of said structural member means.

11. Apparatus comprising:
    an upright structural member on an offshore platform;
    ring means adjustably mounted on said upright structural member;
    hollow female cone means adjustably mounted on said upright member above said ring means;
    stay line means secured to said female cone means at a first end of said stay line means and secured to another structural member of said offshore platform at a second end of said stay line means;
    said stay line means connected with said female cone means by a universally movable connector means;

the second end of said stay line means attached to said other structural member is secured thereto by means of a universally movable connector means; and adjustment means is provided along the length of said stay line means for tensioning said stay line in response to rotation of said adjustment means.

12. Apparatus for coupling a first elongated member to a second elongated member comprising:
at least two longitudinally alignable male connector means having variant axial lengths mounted on said first elongatdd member;
at least two longitudinally alignable female connector means having variant axial lengths mounted on said second elongated member;
said at least two female connector means operable for sequentially receiving said at least two male connector means to form a coupling means;
said at least two female connector means having axial lengths compatible with associated male connector means;
rail means secured to said first elongated member and extending longitudinally thereof; and
said rail means being slidably mounted through a portion of said coupling means and operable to guide relative longitudinal movement between first and second elongated members.

13. Apparatus for coupling a first elongated member to a second elongated member comprising:
longitudinally alignable male connector means mounted on said first elongated member;
longitudinally alignable female connector means mounted on said second elongated member;
said female connector means operable for receiving said male connector means to form a coupling means;
rail means secured to said first elongated member and extending longitudinally thereof;
said rail means being slidably mounted through a portion of said coupling means and operable to guide relative longitudinal movement between said first and said second elongated members;
said second elongated member comprising an upright structural member of an offshore platform disposed within a body of water;
guide line means attached at a first end thereof to said male connector means and passing through said female connector to a point adjacent the surface of the body of water at a second end thereof; and
said guide line means being operable to guide said male cone means into engagement relationship with said female cone means in response to the movement of said guide line means at the second end thereof.

14. Apparatus for coupling a first elongated member to a second elongated member comprising:
longitudinally alignable male connector means mounted on said first elongated member;
longitudinally alignable female connector means mounted on said second elongated member;
said female connector means operable for receiving said male connector means to form a coupling means;
rail means secured to said first elongated member and extending longitudinally thereof;
said rail means being slidably mounted to a portion of said coupling means and operable to guide relative longitudinal movement between said first and said second elongated members; and
locking means removably appliable to said coupling means for securing said male connector means and said female connector means against relative longitudinal movement therebetween after the engagement thereof.

15. An apparatus according to claim 14 with the addition of ring means disposed beneath said female connector means;
said guide line means passing from said male cone means generally downwardly through said female connector means and through said rng means to extend upwardly to a point above the surface of said body of water; and
said ring means operable to provide a downward force to said male cone means in response to an upward force applied to said guide line means toward said second end thereof.

16. Apparatus for coupling a first elongated member to a second elongated member comprising:
longitudinally alignable male connector means mounted on said first elongated member;
longitudinally alignable female connector means mounted on said second elongated member;
said female connector means operable for receiving said male connector means to form a coupling means;
rail means secured to said first elongated member and extending longitudinally thereof;
said rail means being slidably mounted through a portion of said coupling means and operable to guide relative longitudinal movement between said first and said second elongated members; and
adjustment means on said coupling means for adjusting the stand-off distance between said first and second elongated members in a direction transverse to the longitudinal extension thereof.

17. Apparatus for coupling a first elongated member to a second elongated member comprising:
longitudinally alignable male connector means mounted on said first elongated member;
longitudinally alignable female connector means mounted on said second elongated member;
said female connector means operable for receiving said male connector means to form a coupling means;
rail means secured to said first elongated member and extending longitudinally thereof;
said rail means being slidably mounted to a portion of said coupling means and operable to guide relative longitudinal movement between said first and said second elongated members;
said male connector means comprises said portion of said coupling means slidably mounted on said rail means; and
locking means is provided on said male connector means for releasably fixing the position of said male connector means on said rail means.

18. An apparatus according to claim 17 wherein said rail means comprises a monorail secured to said first elongated member; and
said male connector means is slidably connected to said monorail means by a bracket base member being C-shaped in cross-sectional configuration.

19. An apparatus according to claim 17 wherein said locking means comprises set bolt means threadedly mounted through said bracket base member and engageable with a surface on said monorail and further includes through bolt means operably extending through slots formed in said male connector means and said rail means.

20. An apparatus for mounting a riser pipe on an offshore platform comprising:
at least two generally vertically alignable male connector members of different axial length mounted on one of said riser pipes and said offshore platform;
at least two generally vertically alignable female connector means of different axial length mounted on the other side of said riser pipe and said offshore platform;
said at least two female connector means operable for sequentially receiving said at least two male connector means to form a coupling means;
said at least two female connector means having axial lengths compatible with associated male connector means;
rail means mounted on said riser pipe and axially aligned therewith; and
said rail means slidably mounted within a portion of said coupling means and operable to guide the generally vertical movement of said riser pipe with respect to said offshore platform.

21. An apparatus according to claim 20:
wherein each of said male connector means comprises a solid frustoconical shaped member;
each of said female connector means comprises a hollow frustoconical shaped member; and
wherein the shape of the internal surface of each said hollow female connector means corresponds with the outside surface of each said solid male frustoconical shaped member.

22. An apparatus for mounting a riser pipe on an offshore platform comprising:
generally vertically alignable male connector means mounted on one of said riser pipes on said offshore platform;
said made connector means comprises a solid frustoconical shaped member;
generaly vertically alignable female connector means mounted on the other of said riser pipe on said offshore platform;
said female connector means comprising a hollow frustoconical shaped member;
said female connector means operable for receiving said male connector means to form a coupling means;
wherein the shape of the internal surface of said hollow female connector means corresponds with the outside surface of said solid male frustoconical member;
rail means mounted on said riser pipe and axially aligned therewith;
said rail means slidably mounted within a portion of said coupling means and operable to guide a generally vertical movement of said riser pipe with respect to said offshore platform;
ring means secured to said platform beneath said female connector means;
guide line means secured at one end to a lower portion of said male connector means; and
said guide line means passing from said male connector means axially through said female connector means and downwardly through said ring means thereafter to extend upwardly toward the surface of said body of water;
whereby the upward movement of said guide line means is operable to provide the insertable engagement of said male member within said female member from a position above the surface of said body of water.

23. Apparatus according to claim 22:
with the addition of adjustment means for adjusting the generally vertical position of said male member and said female member with respect to said riser pipe and said offshore platform; and
adjustment means provided adjacent said male cone means for adjusting the stand-off distance between said platform member and said riser pipe after the engagement of said male cone member within said female cone member.

24. A method for installing and clamping a riser pipe to an offshore platform comprising the steps:
installing a hollow frusto-conical shaped female connector member on the offshore platform;
installing a cable pulling ring on the offshore platform in a position beneath said frusto-conical female connector member;
providing a longitudinally extending rail means on the riser pipe;
slidably attaching a frusto-conically shaped male member to said rail means on the riser pipe;
providing set bolts for fixing the position of said male member on said rail means;
threading a guide line from a free end of the male connector downwardly through the female connector and downwardly through the pulling ring and thereafter directing the guide line upwardly to a point above the surface of a body of water surrounding the offshore platform;
attaching the second end of said guide line to a surface winch;
supporting the riser pipe adjacent the offshore platform with the male cone members disposed generally above the mating female cone members;
while supportiong the riser pipe so the narrow axial end of the male cone will clear the wide axial end of the female cone, pulling the male cone into the female cone by pulling upwardly on the guide line;
lowering the riser pipe until the mating cones are slightly engaged;
pulling on the guide line while lowering the riser so as to guide the male cone into the female cone;
seating all the male cones within the female cones by relaxing the surface support of the riser pipe;
installing locking pins 20 as to hold the male cones and female cones in engagement;
removing the guide line;
loosening said set screws which fixedly secure the male cone to the riser monorail;
whereby the riser pipe slides downwardly into the bed of the body of water as the monorail slides through the slidable connection between the monorail and the male cone member;
tightening the set bolts associated with the male member whereby the male member becomes fixed with respect to the riser pipe; and installing through bolts through slots formed in said cone members and said monorail to reinforce the holding capability of said set bolts.

25. A method for installing a riser pipe on an offshore platform comprising the steps:
providing female cone members on the offshore platform;
providing male cone members on the riser pipe;
the male cone members being slidably secured to the riser pipe;
inserting the male cone members within the female cone members to form a coupling;
releasing the releasable connection between the male cone members and the riser pipe whereby the riser pipe may be slidably guided downwardly into a final position under the influence of gravity;
tightening the connection between the male cone member and the riser pipe member thereafter.

26. A method according to claim 25 with the additional step of attaching stay lines from the female cone members to platform structural members.

27. A method for installing a riser pipe upon an offshore platform comprising the steps:
providing female cone members on the offshore platform;
providing male cone members on the riser pipe;
the male cone members being slidably secured to the riser pipe;
inserting the male cone members within the female cone members to form a coupling;
releasing the releasable connection between the male cone members to form a coupling;
releasing the releasable connection between the male cone member and the riser pipe to guide the riser pipe downwardly into a final position under the influence of gravity;
tightening the connection between the male cone member and the riser pipe member thereafter;
providing adjustment means for varying distance between the longitudinal extension of the male cone member and the axis of the riser pipe; and
adjusting the stand-off distance between the riser pipe and the offshore platform after the riser pipe has been lowered into a rough final position in the bed of the body of water.

28. A method for installing a riser pipe upon an offshore platform comprising the steps:
providing female cone members on the offshore platform;
providing male cone members on the riser pipe;
the male cone members being slidably secuted to the reiser pipe;
inserting the male cone members within the female cone members to form a coupling;
releasing the releasable connection between the male cone members and the riser pipe to guide the riser pipe downwardly into a inal position under the influence of gravity;
tightening the connection between the male cone member and the riser pipe therafter;
providing a guide line extending from each male cone member downwardly through each female cone member and upwardly to a point adjacent the surface of a body of water surrounding the offshore platform; and
wherein the step of inserting the male cone members within the female cone members to form a coupling includes a step of applying an upward force on the guide line.

29. In an offshore structure, including a platform and vertically extending rail means mounted on said platform, the addition of:
at least two female cone means having different variant lengths;
each of said female cone means being slidably mounted on said rail means;
said female cone means arranged in order of increasing axial length;
means for locking each of said female cone means in a fixed position on said rail means;
at least one of said female cone means being adjsutable in a direction transverse to the longitudinal extension of said rail means; and
each of said female cone means being operable to receive corresponding male cone means having different axial lengths provided on a riser pipe to be mounted on said offshore platform.

* * * * *